(12) United States Patent
Gianni et al.

(10) Patent No.: US 8,941,274 B2
(45) Date of Patent: Jan. 27, 2015

(54) STATOR FOR AN ELECTRIC MOTOR OF A WASHING MACHINE AND METHOD OF MANUFACTURING THE SAME

(75) Inventors: Christian Gianni, Stevensville, MI (US); Marcelo N. Schlickmann, Jaragua do Sul (BR); Orlando Starke, Joinville (BR); Richard S. Wallace, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 339 days.

(21) Appl. No.: 13/427,953

(22) Filed: Mar. 23, 2012

(65) Prior Publication Data
US 2013/0249327 A1 Sep. 26, 2013

(51) Int. Cl.
H02K 3/32 (2006.01)
H02K 1/18 (2006.01)

(52) U.S. Cl.
USPC ............... 310/43; 310/216.011; 310/216.013; 310/216.063

(58) Field of Classification Search
CPC .......... H02K 1/18; H02K 1/185; H02K 1/187
USPC ............... 310/43, 216.011, 216.013, 216.063
See application file for complete search history.

(56) References Cited

U.S. PATENT DOCUMENTS

| | | | |
|---|---|---|---|
| 3,577,851 A | 5/1971 | Detheridge et al. | |
| 3,842,493 A | 10/1974 | Ohuchi et al. | |
| 5,986,377 A | 11/1999 | Yamada et al. | |
| 6,147,431 A | 11/2000 | Asao et al. | |
| 6,429,568 B1 | 8/2002 | Shen et al. | |
| 6,492,749 B1 * | 12/2002 | Shiga et al. | 310/43 |
| 6,630,766 B1 | 10/2003 | Kirn et al. | |
| 6,759,785 B2 | 7/2004 | Miyake et al. | |
| 6,856,064 B2 | 2/2005 | Masumoto et al. | |
| 6,858,964 B2 | 2/2005 | Masumoto et al. | |
| 6,919,665 B2 | 7/2005 | Murakami et al. | |
| 6,933,649 B2 | 8/2005 | Fujii et al. | |
| 7,010,846 B2 | 3/2006 | Nakamura | |
| 7,271,519 B2 | 9/2007 | Lee | |
| 7,332,845 B2 * | 2/2008 | Heideman et al. | 310/216.011 |
| 7,372,184 B2 | 5/2008 | Shim et al. | |
| 7,459,826 B2 | 12/2008 | Lee | |
| 7,466,055 B2 | 12/2008 | Toide et al. | |
| 7,728,481 B2 | 6/2010 | Lee | |
| 7,777,387 B2 | 8/2010 | Nagai et al. | |
| 7,872,391 B2 | 1/2011 | Lim | |
| 7,893,591 B2 | 2/2011 | Myojin | |

(Continued)

OTHER PUBLICATIONS

German Search Report, German Patent Application No. 10 2013 100 910.7, Jul. 26, 2013, 3 pages.

*Primary Examiner* — Terrance Kenerly

(57) ABSTRACT

A stator for an electric motor that includes a plurality of stacked laminations and a polymeric shell coupled to the plurality of laminations. Each lamination includes an annular plate having a plurality of notches defined therein. Each notch has an end positioned between the side walls of the annular plate. A plurality of teeth extend from one side wall of the annular plate. Each lamination includes a first slot defined at the first end of each notch and a second slot spaced apart from the first slot, the first slots of the laminations are aligned to define a first plurality of passageways, the second slots of the laminations are aligned to define a second plurality of passageways, and the polymeric shell includes a plurality of support beams that extend through the first plurality of passageways and the second plurality of passageways.

18 Claims, 9 Drawing Sheets

(56) References Cited

U.S. PATENT DOCUMENTS

| | | |
|---|---|---|
| 7,915,780 B2 | 3/2011 | Tsumagari |
| 7,928,627 B2 | 4/2011 | Nagai et al. |
| 8,450,898 B2 * | 5/2013 | Sears et al. .................... 310/194 |
| 8,816,558 B2 * | 8/2014 | Sears et al. .................... 310/194 |
| 2002/0194723 A1 | 12/2002 | Shen et al. |
| 2005/0067912 A1 * | 3/2005 | Murakami et al. ............ 310/216 |
| 2005/0194860 A1 | 9/2005 | Lee |
| 2006/0103253 A1 * | 5/2006 | Shiga et al. ............... 310/156.45 |
| 2007/0296301 A1 | 12/2007 | Lim |
| 2009/0284096 A1 | 11/2009 | Katagiri et al. |
| 2009/0324435 A1 * | 12/2009 | Sears et al. ................. 417/423.7 |
| 2010/0090560 A1 | 4/2010 | Myojin |
| 2010/0307202 A1 | 12/2010 | Maentele et al. |
| 2011/0016929 A1 | 1/2011 | Ahn |

\* cited by examiner

US 8,941,274 B2

STATOR FOR AN ELECTRIC MOTOR OF A WASHING MACHINE AND METHOD OF MANUFACTURING THE SAME

CROSS-REFERENCE TO RELATED U.S. PATENT APPLICATIONS

Cross-reference is made to co-pending U.S. Utility patent application Ser. No. 13/428,021, entitled "STATOR FOR AN ELECTRIC MOTOR INCLUDING SEPARATELY FORMED END PIECES AND ASSOCIATED METHOD," which was filed on Mar. 23, 2012, which is assigned to the same assignee as the present application and which is hereby incorporated by reference.

TECHNICAL FIELD

The present disclosure relates generally to an electric motor for a washing machine, and, more particularly, to a stator for an electric motor of a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a number of stator field coils. The rotor may include one or more magnets that interact with the stator coils. During operation, the stator coils may be sequentially energized with electricity to cause the rotor to rotate.

SUMMARY

According to one aspect, a stator for an electric motor is disclosed. The stator includes a plurality of stacked laminations, and a polymeric shell coupled to the plurality of laminations. Each lamination has an annular plate including a first side wall, a second side wall positioned opposite the first side wall, and a plurality of notches defined therein. Each notch has a first end positioned between the first side wall and the second side wall and a second end defined in the first side wall. Each lamination has a plurality of teeth extending from the second side wall of the annular plate. Each lamination includes a first slot defined at the first end of each notch and a second slot spaced apart from the first slot. The first slots of the laminations are aligned to define a first plurality of passageways, and the second slots of the laminations are aligned to define a second plurality of passageways. The polymeric shell includes a plurality of support beams that extend through the first plurality of passageways and the second plurality of passageways.

In some embodiments, each notch may be defined by a first inner wall including a planar wall section and a second inner wall including a planar wall section engaged with the planar wall section of the first inner wall. In some embodiments, the first inner wall may include a concave wall section and the second inner wall may include a corresponding concave wall section that cooperates with the concave wall section of the first inner wall to define the first slot.

In some embodiments, the second slot may be defined between the first end and the second end of the notch. Additionally, in some embodiments, the first inner wall may include a second concave wall section, and the second inner wall may include a second corresponding concave wall section that cooperates with the second concave wall section of the first inner wall to define the second slot. In some embodiments, each support beam may be injection-molded into each passageway of the first plurality of passageways In some embodiments, each second slot may be defined at the second end of each notch. Additionally, in some embodiments, the first inner wall may include a chamfer wall section that extends between a first edge connected to the first side wall of the annular plate and a second edge connected to the planar wall section of the first inner wall. The second inner wall may include a corresponding chamfer wall section that extends between a first edge connected to the first side wall of the annular plate and a second edge connected to the planar wall section of the second inner wall. The chamfer wall section of the second inner wall may cooperate with the chamfer wall section of the first inner wall to define the second slot. In some embodiments, each support beam may be injection-molded into each passageway of the first plurality of passageways and the second plurality of passageways.

In some embodiments, an oblique angle may be defined between a central axis of each notch and the second side wall. Each second slot may be positioned between the first side wall and each notch.

According to another aspect, a stator for an electric motor includes a first lamination having a first annular plate and a plurality of notches defining a plurality of segments in the first annular plate. Each segment has a tooth extending therefrom and a slot defined therein. The stator also includes a second lamination positioned on the first lamination. The second lamination includes a second annular plate and a plurality of notches defining a plurality of segments in the second annular plate. Each segment has a tooth extending therefrom and a slot defined therein. Each slot of the second annular plate is aligned with at least one slot of the first annular plate to define a plurality of passageways through the first and the second laminations. A plurality of support beams are positioned in the plurality of passageways, and each passageway is positioned between a pair of planes extending through the first and the second laminations. A first plane of each pair of planes is defined by a notch of the first lamination and a second plane of each pair of planes is defined by a notch of the second lamination. The first plane and the second plane intersect and an acute angle is defined therebetween.

In some embodiments, the first lamination and the second lamination may define a longitudinal axis of the stator. Each tooth may extend in a direction toward the longitudinal axis. Each tooth may extend in a direction away from the longitudinal axis.

In some embodiments, the stator may include a polymeric shell coupled to the first lamination and the second lamination. The polymeric shell may include a plurality of inner surfaces engaged with a plurality of outer surfaces of the first lamination and the second lamination. In some embodiments, the plurality of support beams may extend from a first inner surface of the polymeric shell into the passageways.

In some embodiments, the plurality of support beams may include a plurality of pins. Each pin may include a cylindrical shaft positioned in one of the passageways. In some embodiments, each pin may include a head secured to the cylindrical shaft. The head may engage an outer surface of one of the first annular plate and the second annular plate.

In some embodiments, each notch of the first lamination may be defined between a first inner wall and a second inner wall. The first inner wall may include a substantially planar wall section and a concave wall section that defines a pocket, and the second inner wall may include a substantially planar wall section and a convex wall section positioned in the pocket.

According to another aspect, a stator for an electric motor is disclosed. The stator includes a plurality of stacked laminations. Each lamination has an annular plate including a first side wall, a second side wall positioned opposite the first side wall, and a plurality of notches defined therein. Each notch has a first end positioned between the first side wall and the second side wall and a second end defined in the first side wall. Each lamination has a plurality of teeth extending from the second side wall of the annular plate. Each lamination includes a first slot defined at the first end of each notch and a second slot spaced apart from the first slot. The first slots of the laminations are aligned to define a first plurality of passageways, and the second slots of the laminations are aligned to define a second plurality of passageways. A plurality of support beams extend through the first plurality of passageways and the second plurality of passageways. In some embodiments, each support beam is injection-molded into each passageway of the first plurality of passageways and the second plurality of passageways.

BRIEF DESCRIPTION OF THE DRAWINGS

The detailed description particularly refers to the following figures, in which.

DETAILED DESCRIPTION OF THE DRAWINGS

Figure 1:
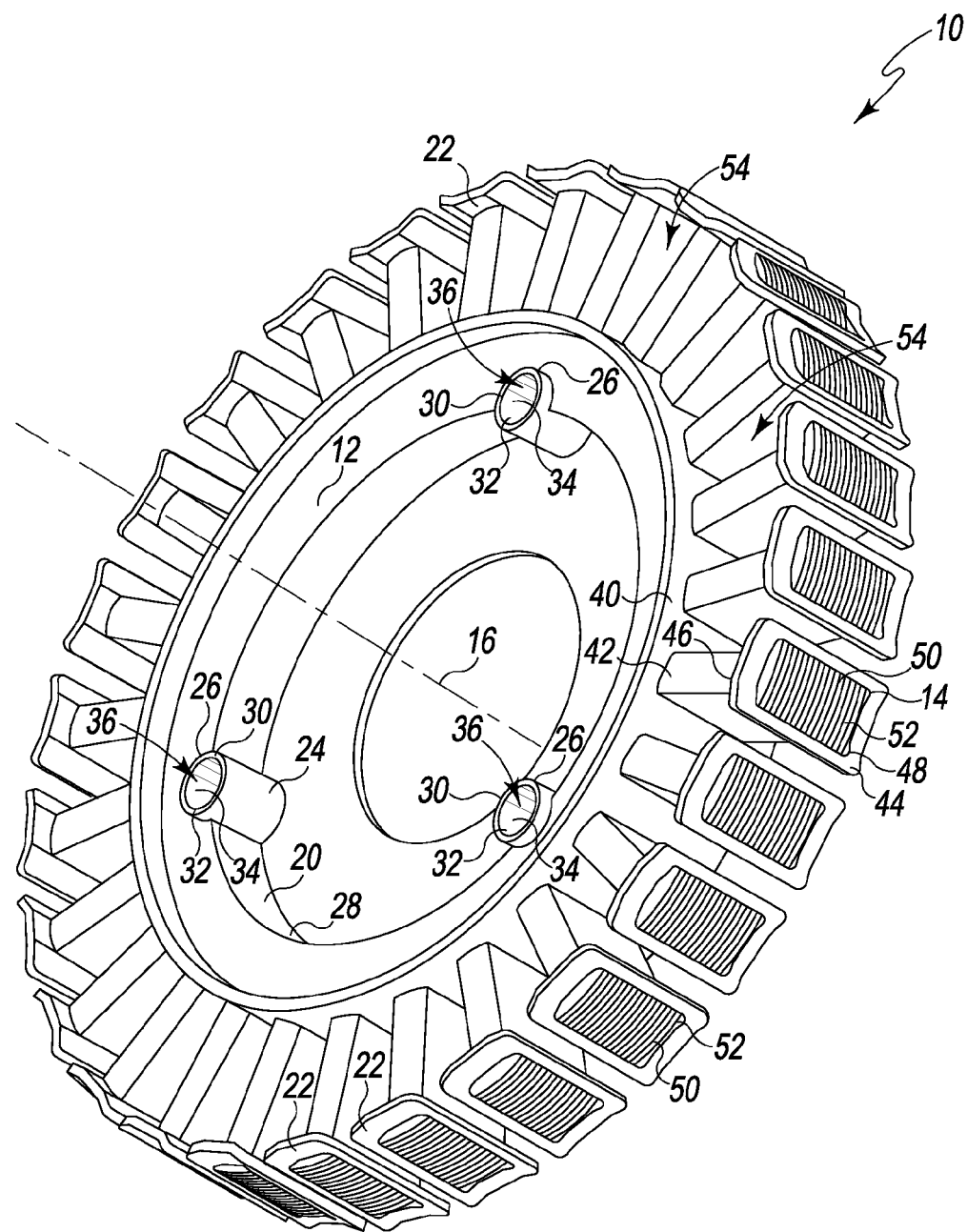
FIG. 1 is a perspective view of a stator of an electric motor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, one embodiment of a stator 10 for an electric motor of a washing machine is shown. One example of an electric motor is shown and described in U.S. Patent App. Pub. No. 2010/0307202, entitled "WASHING MACHINE WITH A DIRECT DRIVE SYSTEM," which is incorporated herein by reference. The stator 10 includes an outer shell 12 and a stator core 14 positioned in the outer shell 12. The outer shell 12 and the stator core 14 define a longitudinal axis 16 extending through the stator 10.

The outer shell 12 of the stator 10 is formed from a polymeric material, such as, for example, a plastic resin, which is molded over the stator core 14 via an injection molding process, as described in greater detail below. The outer shell 12 includes a central hub 20 and a plurality of casings 22 that extend radially outward from the hub 20. The central hub 20 includes a mounting frame 24 configured to secure the stator 10 to a tub (not shown) of the washing machine. In the illustrative embodiment, the mounting frame 24 includes a number of brackets 26 positioned around the cylindrical inner surface 28 of the hub 20. Each bracket 26 includes an outer face 30 that has a circular opening 32 defined therein. An inner surface 34 extends inwardly from the opening 32 to define a bore 36 through the central hub 20. The bore 36 is sized to receive a fastener (not shown), such as, for example, a bolt or other threaded rod, which extends through the bore 36 to engage the tub of the washing machine and secure the stator 10 to the tub.

The central hub 20 of the shell 12 has a cylindrical outer surface 40 positioned opposite the cylindrical inner surface 28. Each casing 22 of the shell 12 includes a body 42 that extends outwardly from the outer surface 40 away from the longitudinal axis 16 of the stator 10. Each casing 22 also has a flange 44 that extends outwardly from the radial end 46 of the body 42. As shown in FIG. 1, each flange 44 has an opening 48 defined therein. As described in greater detail below, the stator core 14 includes a tooth 50 that is positioned in each casing 22 of the shell 12. Each tooth 50 of the stator core 14 has a tooth head or end piece 52 extending from each opening 48 of the casing 22.

The stator 10 has a number of coil slots 54 defined between the plurality of casings 22 of the shell 12. Each coil slot 54 is sized to receive a field coil (not shown) of the stator 10. The field coils are wrapped around the casings 22 (and hence teeth 50) of the stator 10. In operation, the field coils are energized selectively to generate magnetic fields around the teeth 50 of the stator core 14. As the field coils are energized, the end pieces 52 of teeth 50 function as electromagnets that interact with the permanent magnets of the rotor (not shown) to cause the rotor to spin.

In the illustrative embodiments of FIGS. 1-8, the stator 10 is an inner stator, which is positioned in the center of the electric motor and surrounded by an outer rotor. As a result, the teeth 50 of the stator core 14 extend radially outward from the longitudinal axis 16 of the stator 10. It should be appreciated that in other embodiments the stator 10 may be an outer stator that surrounds an inner rotor located in the center of the electric motor. In such embodiments, the teeth of the stator core extend radially inward toward the longitudinal axis of the stator. The embodiment of FIGS. 9-12 is one example of a stator core of an outer stator.

Figure 2:
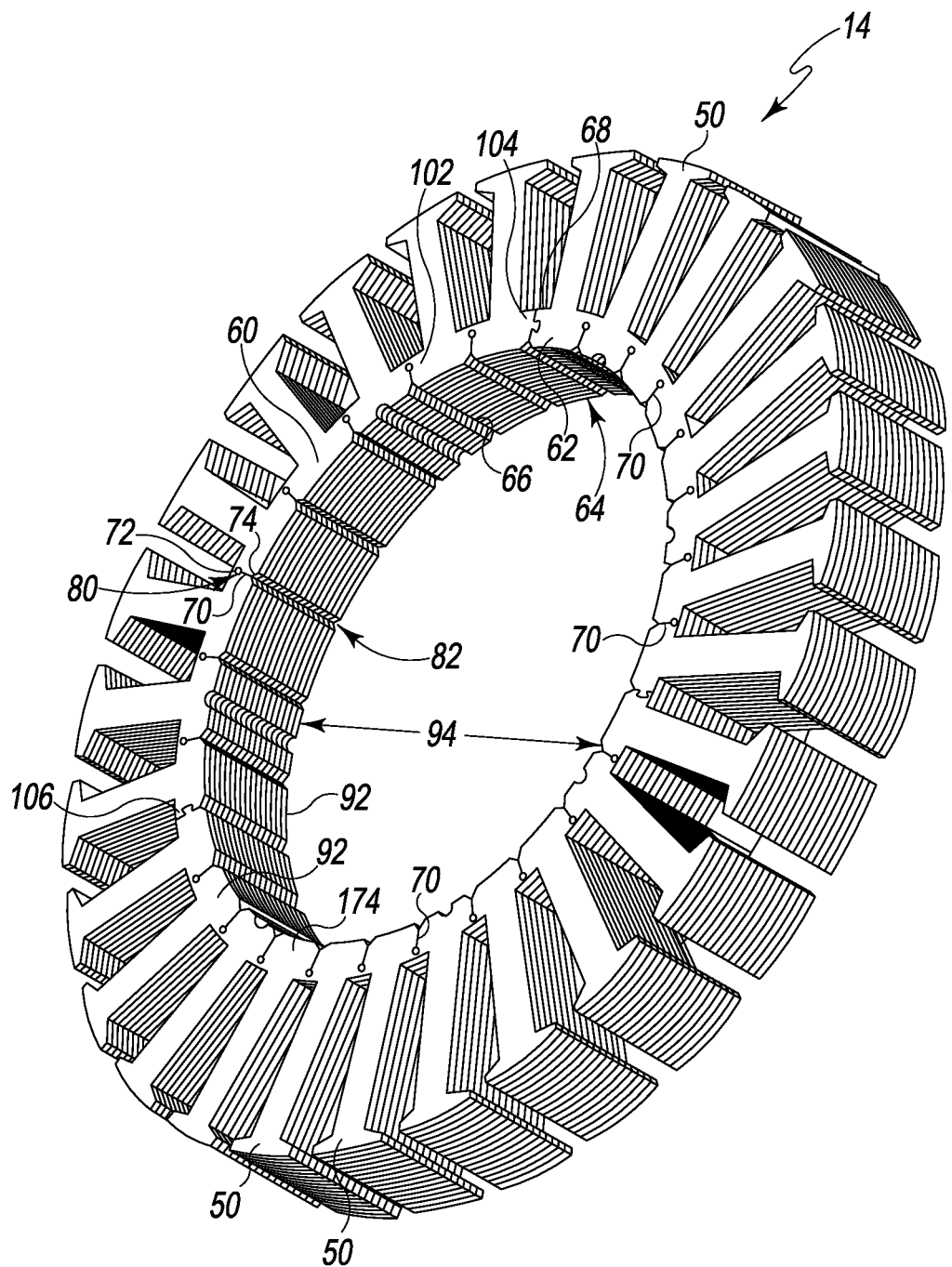
FIG. 2 is a perspective view of one embodiment of a stator core for the stator of FIG. 1.

Referring now to FIG. 2, the stator core 14 of the stator 10 includes a yoke 60 and the plurality of teeth 50 that extend radially outward from the yoke 60. The yoke 60 includes a pair of outer annular surfaces 62, 64 and a pair of side walls 66, 68 that extend between the annular surfaces 62, 64. The yoke 60 also has a plurality of grooves 70 defined therein. Each groove 70 is positioned between a pair of teeth 50 and extends through the surface 62, 64 of the yoke 60.

Each groove 70 extends inwardly from an end 72 positioned between the side walls 66, 68 of the yoke 60 to an end 74 defined in the side wall 66. The yoke 60 includes passageways 80, 82 that are defined at the ends 72, 74, respectively, of each groove 70. As described in greater detail below, support beams 84 of the outer shell 12 are formed in the passageways 80, 82 when the shell 12 is molded over the stator core 14.

As described above, the stator core 14 includes a plurality of teeth 50 that extend from the yoke 60. Each tooth 50 includes an arm 86 extending from an end 88 attached to the yoke 60 to an end 90. The tooth head or end piece 52 of each tooth 50 is secured to the end 90. In the illustrative embodiment, the end pieces 52 are integrally formed with the arms 86 of the teeth 50. It should be appreciated that in other embodiments the end pieces may be formed separately from the yoke 60 and the arms 86. In such embodiments, the end pieces may be attached to the arms during subsequent assembly steps. One exemplary process for separately forming and assembling the end pieces is described in U.S. Utility patent application Ser. No. 13/428,021 entitled "STATOR FOR AN ELECTRIC MOTOR INCLUDING SEPARATELY FORMED END PIECES AND ASSOCIATED METHOD," which was filed on Mar. 23, 2012 and which is incorporated herein by reference.

Figure 3:
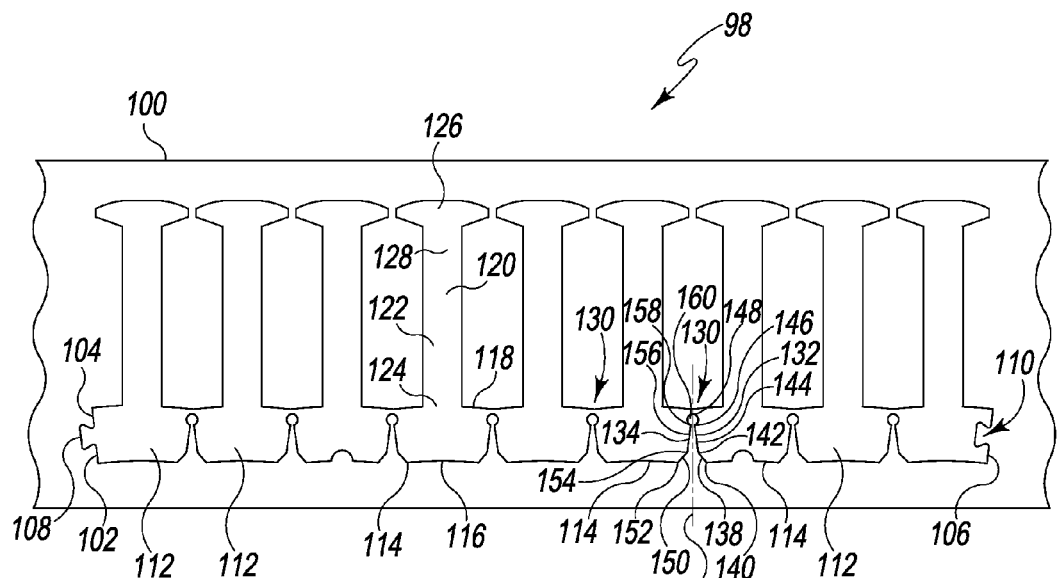
FIG. 3 is a top plan view of a lamination strip of the stator core of FIG. 2.
Figure 4:
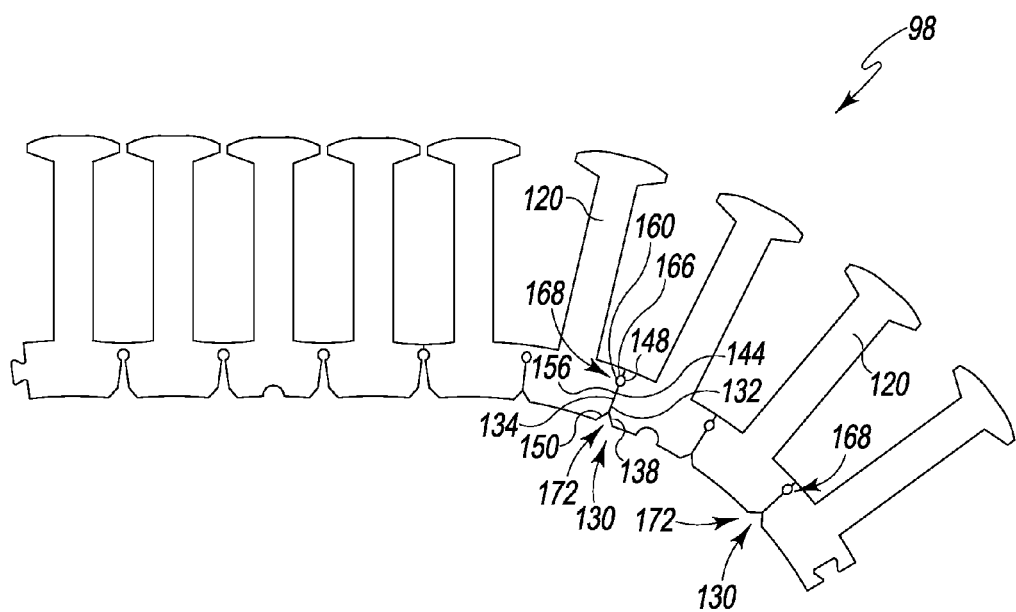
FIG. 4 is a top plan view similar to FIG. 3 showing the lamination strip partially bent into the shape of the stator core of FIG. 2.
Figure 5:
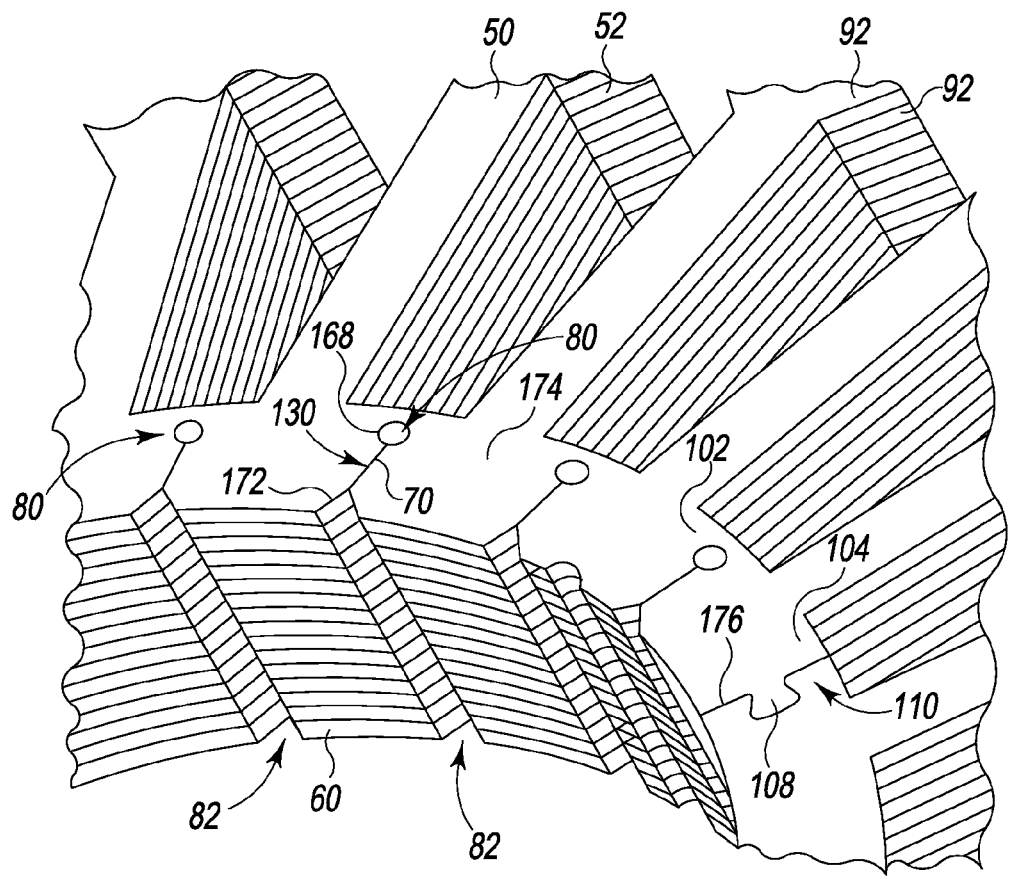
FIG. 5 is a fragmentary perspective view of the stator core of FIG. 2 showing the lamination strip of FIG. 4 attached to other lamination strips and assembled into a plurality of stacked laminations.

The stator core 14 of the stator 10 is formed from a plurality of stacked laminations 92. Each lamination 92 is formed from a metallic material, such as, for example, steel. As shown in FIGS. 3-5 and described in greater detail below, the stator core 14 may be manufactured by producing a number of generally flat metal strips 98. Each strip 98 may be bent and assembled with one or more other strips 98 to produce a lamination 92. Additional laminations 92 may be similarly produced and stacked together to form the stator core 14.

The lamination strip 98 shown in FIG. 3 may be produced via a progressive stamping process. To do so, a metal strip or sheet 100 may be advanced through one or more stations of a progressive stamping die. As the sheet 100 is moved through the stations, the sheet 100 is cut into one or more generally flat metal strips 98. It should be appreciated that the sheet 100 may be the same length as the strip 98 or may be part of a larger roll of sheet metal that is advanced through the stamping die and cut into one or more pieces.

The strip 98 includes a substantially straight plate 102 extending from a longitudinal end 104 to another longitudinal end 106. The plate 102 includes a tab 108 that extends outwardly from the longitudinal end 104. A notch 110 is defined in the opposite longitudinal end 106 of the plate 102 and is sized to receive a corresponding tab 108 of another strip 98 such that the strips 98 may be joined together, as described in greater detail below. It should be appreciated that in other embodiments the ends 104, 106 may include additional tabs and/or slots. It should also be appreciated that in other embodiments the tabs and slots may be omitted.

As shown in FIG. 3, the plate 102 includes a plurality of interconnected segments 112. Each segment 112 has a side wall 114, and the side wall 114 has a surface 116 that is concave. The radius of the surface 116 corresponds to the internal diameter 94 defined by the side wall 66 of the yoke 60. Each segment 112 of the plate 102 also has a side wall 118 positioned opposite the side wall 114 and a protrusion 120 that extends outwardly from the side wall 118.

As described in greater detail below, each protrusion 120 corresponds to a tooth 50 of the stator core 14. Each protrusion 120 has a body 122 that includes a base 124 attached to the side wall 118 of the plate 102. A tip 126 is attached to an end 128 of the body 122. As shown in FIG. 3, the tip 126 of each protrusion 120 has an oblong cross-section. It should be appreciated that in other embodiments the tip 126 may take the form of a rectangle, oval, or other geometric shape.

The plate 102 has a plurality of notches 130 positioned between the segments 112. Each notch 130 is defined by a pair of inner walls 132, 134 that extend inwardly from the side walls 114 of the segments 112. The inner wall 132 includes a chamfer wall section 138 that extends from an outer edge 140 connected to the side wall 114 of one segment 112 to an inner edge 142. The inner edge 142 of the wall section 138 is connected to a substantially planar wall section 144. The wall section 144 of the inner wall 132 extends inwardly from the edge 142 to an edge 146 connected to a concave wall section 148 of the inner wall 132.

The other inner wall 134 of the plate 102 includes a chamfer wall section 150 that extends from an outer edge 152 connected to the side wall 114 of another segment 112 to an inner edge 154. The inner edge 154 of the wall section 150 is connected to a substantially planar wall section 156. The wall section 156 of the inner wall 134 extends inwardly from the edge 154 to an edge 158 connected to a concave wall section 160 of the inner wall 134. The concave wall section 160 of the inner wall 134 is joined with the concave wall section 148 of the inner wall 132 along the central axis 162 of the notch 130.

After the lamination strip 98 is produced, the plate 102 may be bent into a curved shape. As shown in FIG. 4, the plate 102 may be curled or rolled about an imaginary axis such that the substantially planar wall section 144 of each inner wall 132 is brought into contact with the substantially planar wall section 156 of the inner wall 134. At one end 166 of each notch 130, the concave wall sections 148, 160 of the inner walls 132, 134 cooperate to define a slot 168 in the plate 102. At the other end 170 of each notch 130, the chamfer wall sections 138, 150 cooperate to define a slot 172 in the plate 102.

The plate 102 of the strip 98 may be joined at each end 104, 106 to a number of other plates 102 to produce an annular plate 174 (see FIG. 5) of one lamination 92. To do so, the tab 108 of the end 104 of one plate 102 may be positioned in the notch 110 of the end 106 of another plate 102. The ends 104, 106 are further joined by welding the strips 98 along the seams 176 defined between the ends 104, 106 of the plates 102. It should be appreciated that the plates 102 may be secured together before or after undergoing the bending process. It should also be appreciated that in other embodiments the strips 98 may be stacked into segments of the stator core 14 prior to being secured together at the ends 104, 106.

In the illustrative embodiment, three strips 98 are required to make a single lamination 92 of the stator core 14. It should be appreciated that in other embodiments additional strips may be required for a single lamination. It should also be appreciated that in other embodiments a single lamination might be formed from a single strip.

As shown in FIG. 5, the laminations 92 may be stacked to form the stator core 14. The annular plates 174 of the laminations 92 are aligned to form the yoke 60 of the stator core 14, while the protrusions 120 of the laminations 92 form the teeth 50 and the end pieces 52 of the stator core 14. The notches 130 of each lamination 92 are aligned to form the grooves 70 extending through the yoke 60. The slots 168 of each lamination 92 cooperate to define the passageway 80 through the yoke 60, and the slots 172 cooperate to define the passageway 82 through the yoke 60 when the laminations 92 are assembled to form the stator core 14.

Figure 6:
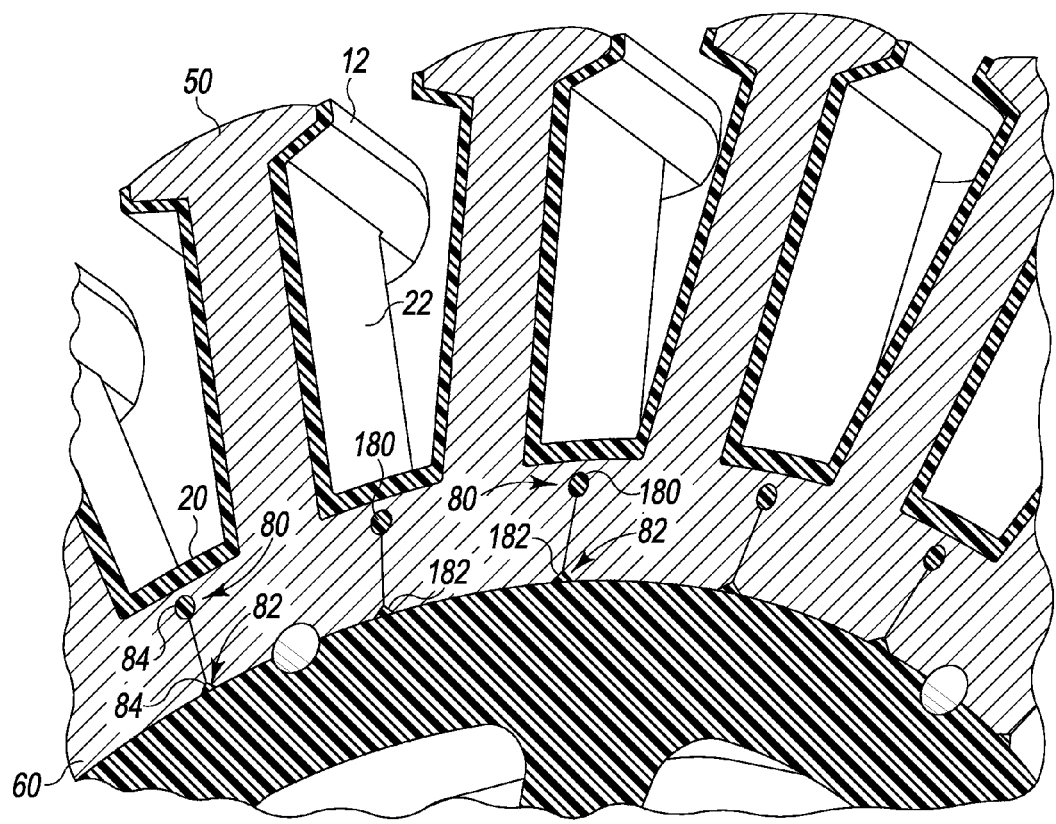
FIG. 6 is a cross-sectional perspective view of the stator of FIG. 1.

After the stator core 14 is produced, the shell 12 may be secured to the stator core 14. In the illustrative embodiment, the shell 12 is molded over the yoke 60 and the teeth 50 in an injection molding process. To do so, the stator core 14 may be placed in a mold. A polymeric or plastic material is injected into the mold and flows over the stator core 14. When the material cools, the central hub 20 and the casing 22 are formed over the yoke 60 and the teeth 50, thereby securing the shell 12 to the stator core 14, as shown in FIG. 6.

Figure 7:
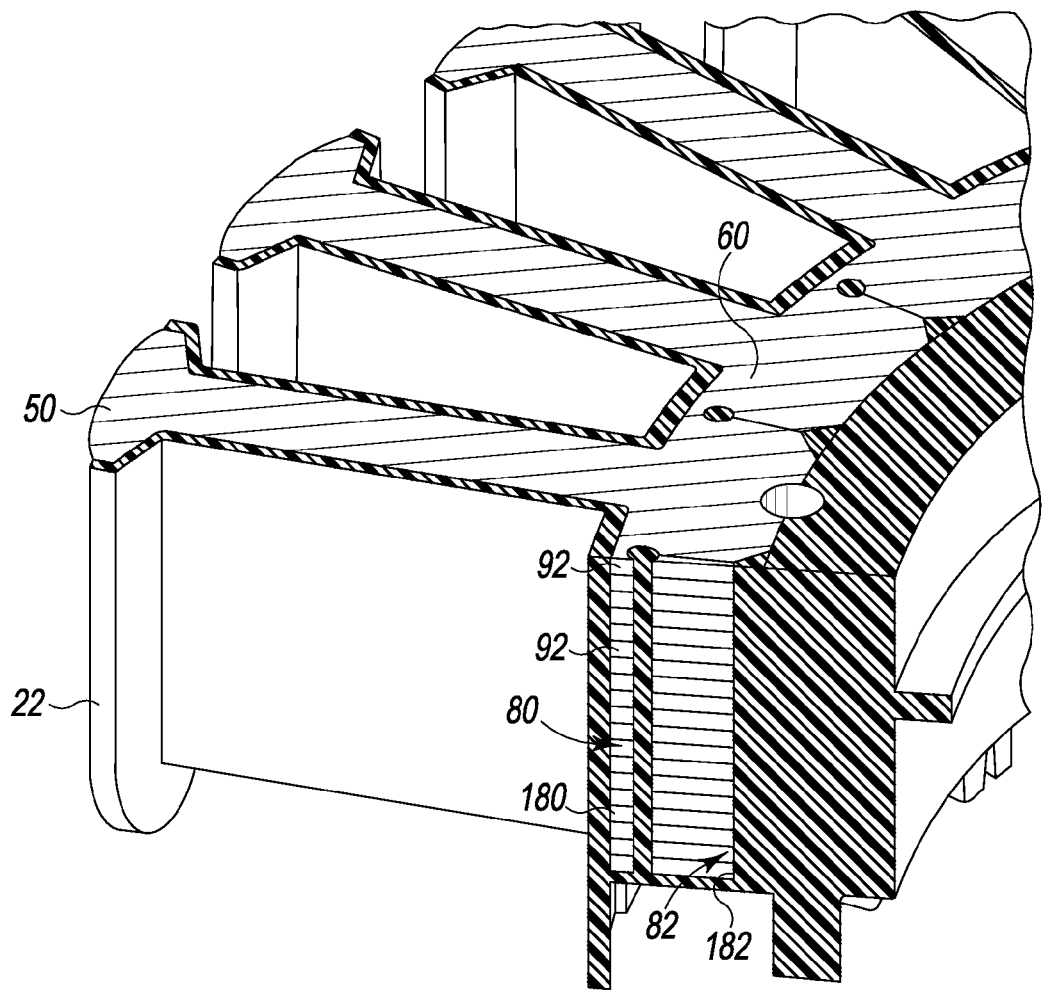
FIG. 7 is another cross-sectional perspective view of the stator of FIG. 1.
Figure 8:
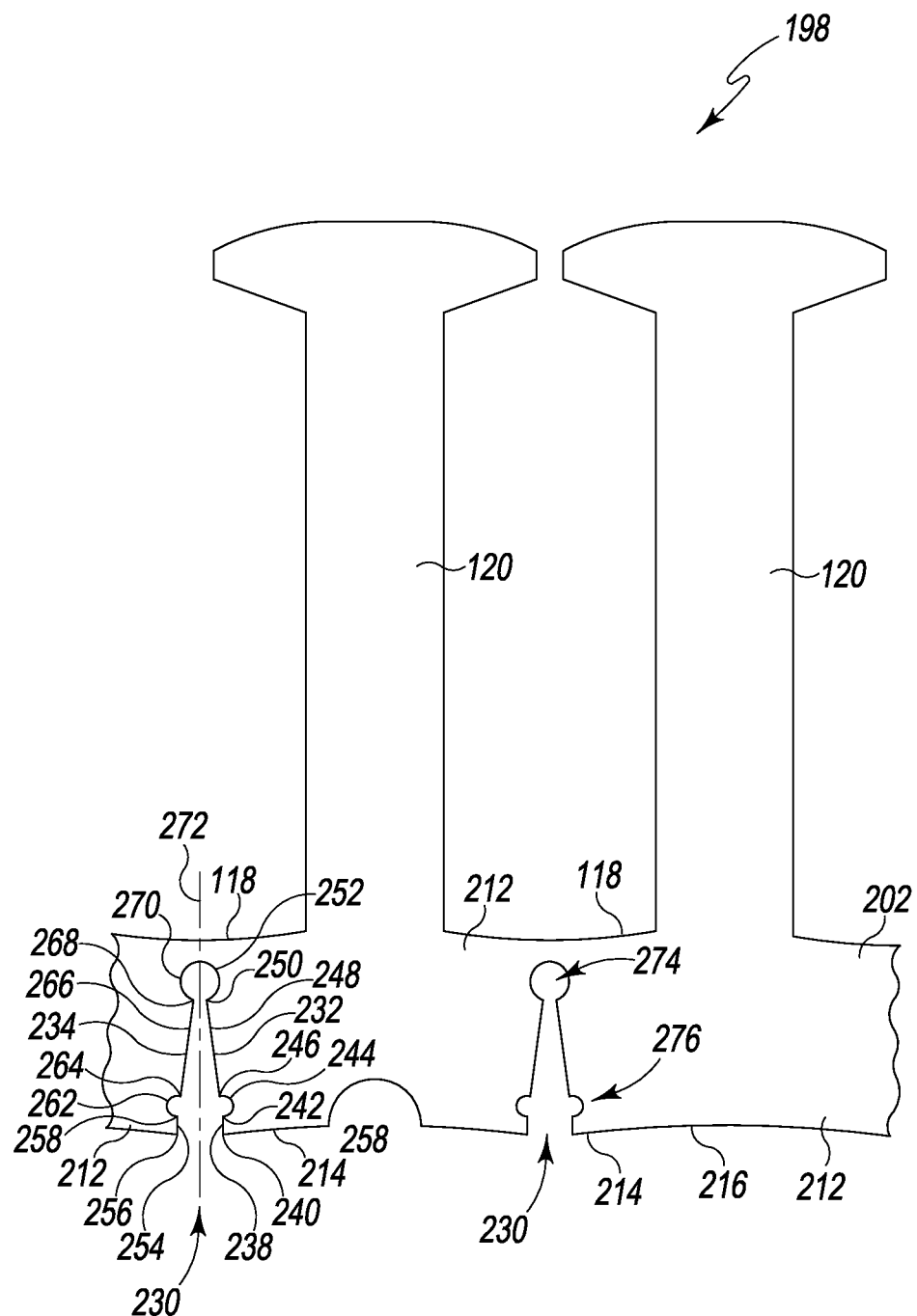
FIG. 8 is a top plan view of another embodiment of a lamination strip of the stator of FIG. 1.

As the polymeric material is injected into the mold, the material flows into the passageways 80, 82 defined in the yoke 60 of the stator core 14. In that way, the support beams 84 of the shell 12 are formed. As shown in FIG. 7, the support beams 84 extend through the passageways 80, 82 between the inner surfaces 178 of the shell 12. In the passageways 80, a number of cylindrical support beams 180 are formed. In each passageway 82, a support beam 182, which has a triangular cross-section, is formed in the yoke 60. The support beams 180, 182 of the shell 12 fill the entire volume of the passageways 80, 82, thereby increasing the stiffness and strength of the stator 10.

It should be appreciated that in other embodiments the notches defined in each lamination may have slots with different cross-sections such that the passageways (and hence the support beams) may take different geometric shapes. For example, referring now to FIG. 8, another embodiment of a generally flat metal lamination strip (hereinafter strip 198) is shown. As described in greater detail below, the passageways defined by the assembled stack of lamination strips 198 are cylindrical in shape.

Similar to the lamination strip 98 described above in regard to FIGS. 1-7, the strip 198 may be produced via a progressive stamping process and is configured to be assembled with one or more other strips to form one of the laminations of the stator core 14. The strip 198 includes a substantially straight plate 202. The plate 202 includes a plurality of interconnected segments 212. Each segment 212 has a side wall 214, and the side wall 214 has a surface 216 that is concave. Each segment 212 of the plate 202 also has another side wall 118 positioned opposite the side wall 214 and a protrusion 120 that extends outwardly from the side wall 118.

The plate 202 of the strip 198 has a plurality of notches 230 positioned between the segments 212. Each notch 230 is defined by a pair of inner walls 232, 234 that extend inwardly from the side walls 214 of the segments 212. The inner wall 232 includes a substantially planar wall section 238 that extends from an outer edge 240 connected to the side wall 214 of one segment 212 to an inner edge 242. The inner edge 242 of the wall section 238 is connected to a concave wall section 244 that extends inwardly from the edge 242 to another edge 246. The edge 246 is connected to another substantially planar wall section 248, which extends inwardly from the edge 246 to an edge 250. The edge 250 is connected to another concave wall section 252 of the inner wall 232.

The other inner wall 234 of the plate 202 includes a substantially planar wall section 254 that extends from an outer edge 256 connected to the side wall 214 of one segment 212 to an inner edge 258. The inner edge 258 of the wall section 254 is connected to a concave wall section 262 that extends inwardly from the edge 258 to another edge 264. The edge 264 is connected to another substantially planar wall section 266, which extends inwardly from the edge 264 to an edge 268. The edge 268 is connected to another concave wall section 270 of the inner wall 234. The concave wall section 270 of the inner wall 234 is joined with the concave wall section 252 of the inner wall 232 along the central axis 272 of the notch 230.

After the lamination strip 198 is produced, the strip 198 may be bent into a curved shape. Similar to the plate 102 of the strip 98, the plate 202 of the strip 198 may be curled or rolled such that the substantially planar wall sections 238, 248 of the inner wall 232 are brought into contact with the substantially planar wall sections 254, 266, respectively, of the inner wall 234. The concave wall sections 252, 270 of the inner walls 232, 234 cooperate to define a slot 274 in the plate 202, and the concave wall sections 244, 262 of the inner walls 232, 234 cooperate to define a slot 276 in the plate 202.

When the lamination strip 198 is assembled into a lamination and stacked with other laminations to form a stator core, the slots 274 of each lamination cooperate to define passageways through the stator core. The passageway defined by the slots 274, like the passageways 80 described above in regard to FIGS. 1-7, are cylindrical. The slots 276 of each lamination also cooperate to define passageways through the stator core when the laminations are assembled. The passageways defined by the slots 276 are also cylindrical, and, as a result, any support beams formed therein also have a cylindrical shape.

Figure 9:
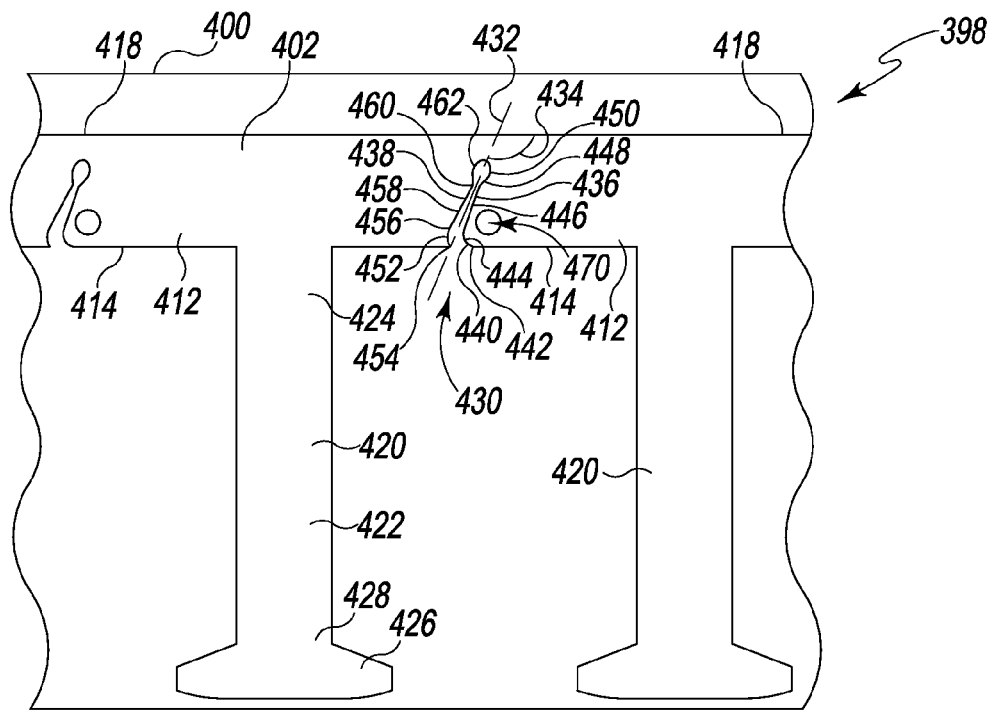
FIG. 9 is a top plan view of another embodiment of a lamination strip of a stator.
Figure 10:
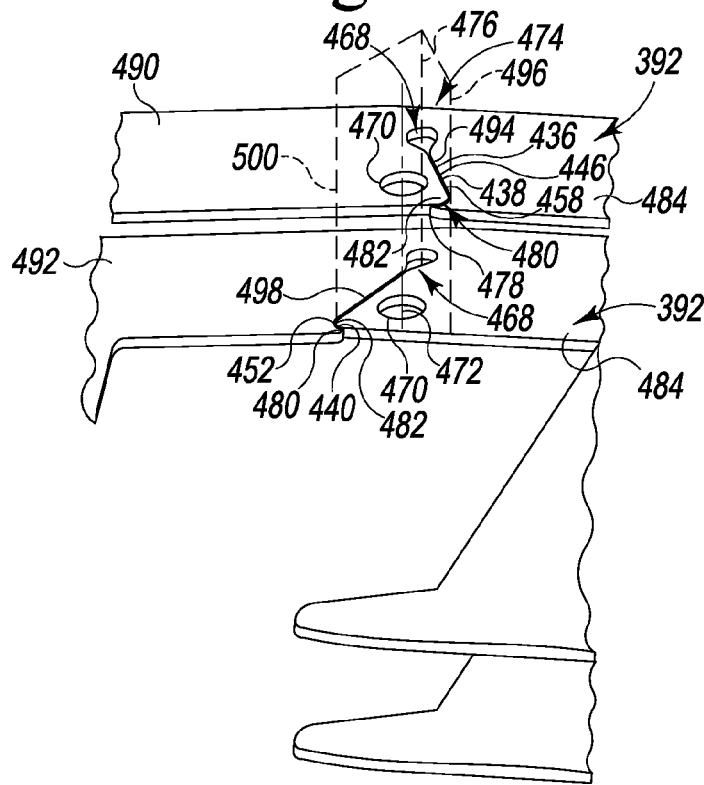
FIG. 10 is a perspective view of the lamination strip of FIG. 9 aligned for assembly with another lamination strip.
Figure 11:
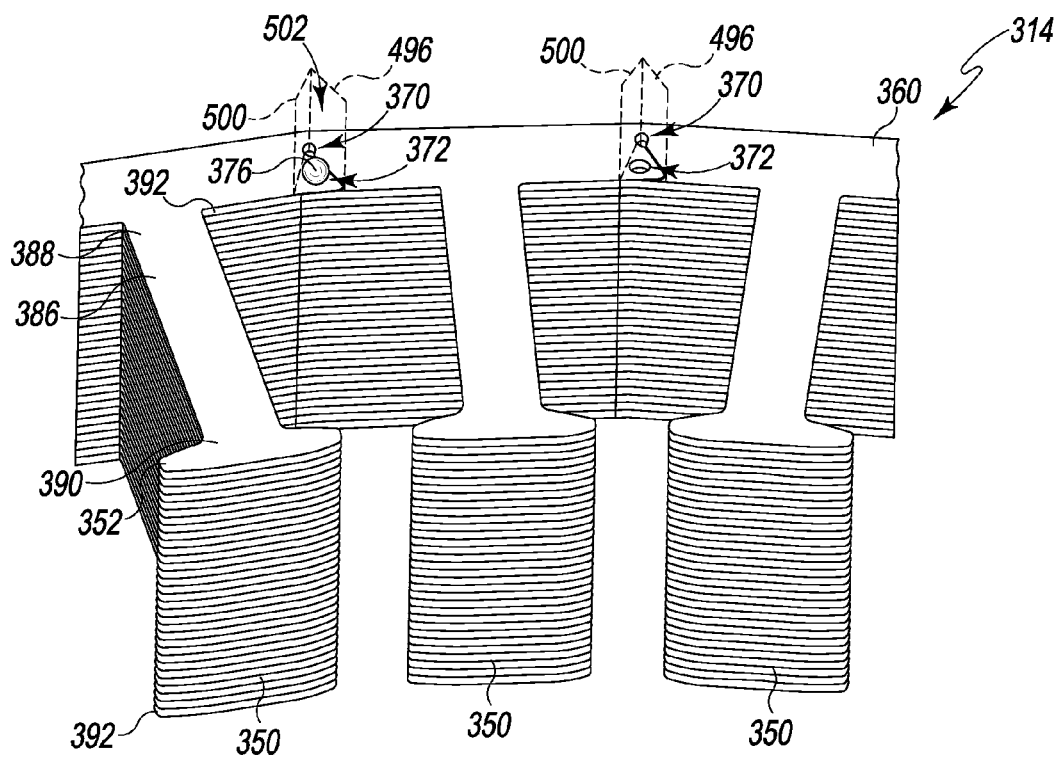
FIG. 11 is a fragmentary perspective view of a stator core including the lamination strips of FIGS. 9 and 10.

Referring now to FIGS. 9-12, another embodiment of a stator core 14 (hereinafter stator core 314) is illustrated. Some features of the embodiment illustrated in FIGS. 9-12 are substantially similar to those discussed above in reference to the embodiment of FIGS. 1-7. Such features are designated in FIGS. 9-12 with the same reference numbers as those used in FIGS. 1-7. As shown in FIG. 11, the stator core 314 includes a yoke 360 and a plurality of teeth 350 that extend radially inward from the yoke 360. As described above, in other embodiments the teeth may extend outward from the yoke. Each tooth 350 has a tooth head or end piece 352 secured to the radial end thereof. The yoke 360 of the stator core 314 further has a pair of passageways 370, 372 defined therein, which are sized to receive support beams, as described in greater detail below.

Each tooth 350 of the stator core 314 includes an arm 386 extending from an end 388 attached to the yoke 360 to an end 390. The tooth head or end piece 352 of each tooth 350 is secured to the end 390. In the illustrative embodiment, the end pieces 352 are integrally formed with the arms 386 of the teeth 350. It should be appreciated that in other embodiments the end pieces may be formed separately from the yoke 360 and the arms 386. As described above, the end pieces may be attached to the arms during subsequent assembly steps in such embodiments.

The stator core 314 is formed from a plurality of stacked laminations 392. Each lamination 392 is formed from a metallic material, such as, for example, steel. Similar to the embodiment of FIGS. 1-7, the stator core 314 may be manufactured by producing a number of generally flat metal strips 398, as shown in FIG. 9. Each strip 398 may be bent and assembled with one or more other strips 398 to produce a lamination 392. Additional laminations 392 may be similarly produced and stacked together to form the stator core 314.

The lamination strip 398 shown in FIG. 9 may be produced via a progressive stamping process. To do so, a metal strip or sheet 400 is advanced through one or more stations of a progressive stamping die. As the sheet 400 is moved through the stations, the sheet 400 is cut into one or more generally flat metal strips 398. The strip 398 includes a substantially straight plate 402 and a plurality of protrusions 420 that extend from the plate 402. Similar to the embodiment of FIGS. 1-7, the plate 402 may include one or more fasteners, such as, for example, tabs and/or notches, that permit one ore more strips 398 to be joined together.

As shown in FIG. 9, the plate 402 includes a plurality of interconnected segments 412. Each segment 412 has a side wall 414 and a side wall 418 positioned opposite the side wall 414. Each protrusion 420 extends outwardly from the side wall 414. As described in greater detail below, each protrusion 420 corresponds to a tooth 350 of the stator core 314. Each protrusion 420 has a body 422 that includes a base 424 attached to the side wall 414 of the plate 402. A tip 426 is attached to an end 428 of the body 422, and, in the illustrative embodiment, the tip 426 of each protrusion 420 has an oblong cross-section. It should be appreciated that in other embodiments the tip 426 may take the form of a rectangle, oval, or other geometric shape.

The plate 402 has a plurality of notches 430 positioned between the segments 412. Each notch 430 has a central axis 432, and, as shown in FIG. 9, an oblique angle 434 is defined between the central axis 432 and the side walls 418 of the segments 412. Each notch 430 is defined by a pair of inner walls 436, 438 that extend inwardly from the side walls 414 of the segments 412. The inner wall 436 includes a convex or curved wall section 440 that extends from an outer edge 442 connected to the side wall 414 of one segment 412 to an inner edge 444. The inner edge 444 of the wall section 440 is connected to a substantially planar wall section 446. The wall section 446 extends inwardly from the edge 444 to another edge 448 connected to a concave wall section 450.

The other inner wall 438 defining each notch 430 includes a concave wall section 452 that extends from an outer edge 454 connected to the side wall 414 of another segment 412 to an inner edge 456. The inner edge 456 is connected to a substantially planar wall section 458, which extends inwardly from the edge 456 to another edge 460 connected to a concave wall section 462. The concave wall section 462 of the inner wall 438 is joined with the concave wall section 450 of the inner wall 436 along the central axis 432 of the notch 430.

Each segment 412 of the plate 402 further has a slot 470 defined therein. As shown in FIG. 9, the slot 470 is positioned adjacent to the notch 430 and the side wall 414 of the plate 402. In the illustrative embodiment, the slot 470 has a circular cross-section and defines a longitudinal axis 472. It should be appreciated that in other embodiments the slot 470 may have a triangular, rectangular, oblong, or other geometric cross-section.

After the lamination strip 398 is produced, the strip 398 may be bent into a generally curved shape. As shown in FIG. 10, the plate 402 may be curled or rolled such that the substantially planar wall section 446 of each inner wall 436 is brought into contact with the substantially planar wall section 458 of the opposite inner wall 436. At one end 474 of each notch 430, the concave wall sections 450, 462 of the inner walls 436, 438 cooperate to define a slot 468 in the plate 402. As shown in FIG. 10, each slot 468 defines a longitudinal axis 476. At the other end 478 of each notch 430, the concave wall section 452 of the inner wall 436 defines a pocket 480 sized to receive a tip 482 defined by the convex wall section 440 of the inner wall 436.

Similar to the embodiment of FIGS. 1-7, the plate 402 of the strip 398 may be joined with a number of other plates 402 to produce an annular plate 484 and a complete lamination 392. As shown in FIG. 10, the laminations 392 may be stacked to form the stator core 314. To do so, the annular plates 484 of each lamination 392 are aligned to form the yoke 360 of the stator core 314, and the protrusions 420 of the laminations 392 are aligned to form the teeth 350 and the end pieces 352 of the stator core 314. Additionally, the longitudinal axes 472 of the slots 470 of each lamination 392 are aligned, and the slots 470 cooperate to define the passageway 372 through the yoke 360 of the stator core 314. The longitudinal axes 474 of the slots 468 of each lamination 392 are also aligned, and the slots 468 cooperate to define the passageway 370 through the yoke 360.

In the stator core 314, the direction of every other stacked lamination 392 is reversed. As shown in FIG. 10, the direction of an upper lamination 490 is reversed from a lower lamination 492 such that the notches 430 of the upper lamination 490 are not aligned with the notches 430 of the lower lamination 492. For example, the upper lamination 490 includes a notch 494 of the plurality of notches 430 that defines an imaginary plane 496. The lower lamination 492 includes a notch 498 that defines an imaginary plane 500. The imaginary plane 500 intersects with the imaginary plane 496 of the notch 494 of the upper lamination 490. As shown in FIG. 11, an acute angle 502 is defined between the planes 496, 500, and the passageway 372 of the stator core 314 is positioned between the planes 496, 500.

Figure 12:
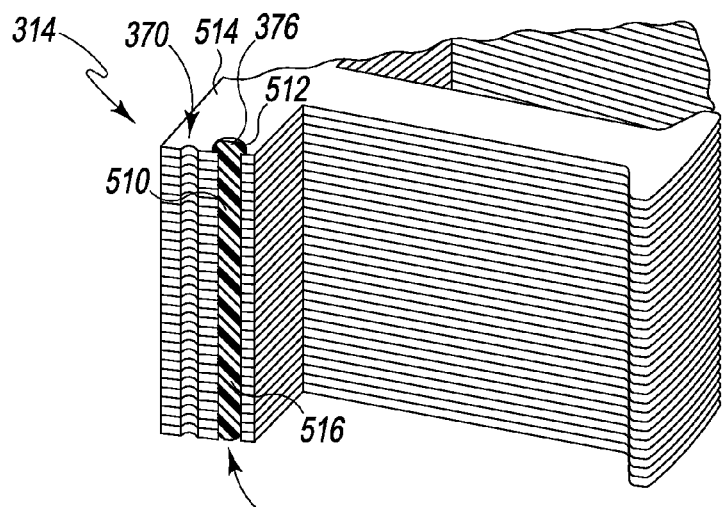
FIG. 12 is a cross-sectional perspective view of the stator core of FIG. 11.

As described above, each passageway 372 of the stator core 314 is sized to receive a support beam 376. As shown in FIGS. 11 and 12, the support beam 376 is illustrative embodied as a pin 510. The pin 510 has a head 512 configured to engage an outer surface 514 of the stator core 314 and a cylindrical shaft 516 sized to be received in the passageway 372. The shaft 516 of the pin 510 is sized to substantially fill the volume of the passageway 372, thereby securing the laminations 392 together and increasing the stiffness and strength of the stator core 314.

Similar to the embodiment of FIGS. 1-7, a polymeric shell (not shown) may be secured to the stator core 314. The shell may be molded over the yoke 360 and the teeth 350 in an injection molding process. To do so, the stator core 314 may be placed in a mold. A polymeric or plastic material is injected into the mold and flows over the stator core 314. When the material cools, the shell is formed over the stator core 314.

As the polymeric material is injected into the mold, the material flows into the passageways 370 defined in the yoke 360 of the stator core 314. In that way, support beams may be formed in the passageways 370. The support beams extend through the passageways 370 and fill the entire volume of the passageways 370, thereby increasing the stiffness and strength of the stator. It should be appreciated that in other embodiments the support beams, like the support beams 376, may be pins positioned in the passageways 370. It should also be appreciated that in other embodiments the pins 510 may be omitted, and the support beams 376 may be formed from injection-molded polymeric material.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A stator for an electric motor, comprising:
   a plurality of stacked laminations, each lamination comprising:
   an annular plate including (i) a first side wall, (ii) a second side wall positioned opposite the first side wall, and (iii) a plurality of notches defined therein, each notch having a first end positioned between the first side wall and the second side wall and a second end defined in the first side wall, and a plurality of teeth extending from the second side wall of the annular plate, and a polymeric shell coupled to the plurality of laminations, wherein (i) each lamination includes a first slot defined at the first end of each notch and a second slot spaced apart from the first slot, (ii) the first slots of the laminations are aligned to define a first plurality of passageways, (iii) the second slots of the laminations are aligned to define a second plurality of passageways, and (iv) the polymeric shell includes a plurality of support beams that extend through the first plurality of passageways and the second plurality of passageways, wherein each notch is defined by:

(i) a first inner wall including a first planar wall section and a chamfer wall section that extends between a first edge connected to the first side wall of the annular plate and a second edge connected to the first planar wall section of the first inner wall, and (ii) a second inner wall including a second planar wall section engaged with the first planar wall section of the first inner wall and a corresponding chamfer wall section that extends between a first edge connected to the first side wall of the annular plate and a second edge connected to the second planar wall section of the second inner wall, the chamfer wall section of the second inner wall cooperating wit the chamfer wall section of the first inner wall to define the second slot.

2. The stator of claim 1, wherein the first inner wall includes a concave wall section and the second inner wall includes a corresponding concave wall section that cooperates with the concave wall section of the first inner wall to define the first slot.

3. The stator of claim 2, wherein each second slot is defined between the first end and the second end of each notch.

4. The stator of claim 3, wherein the first inner wall includes a second concave wall section, and the second inner wall includes a second corresponding concave wall section that cooperates with the second concave wall section of the first inner wall to define the second slot.

5. The stator of claim 4, wherein each support beam is injection-molded into each passageway of the first plurality of passageways.

6. The stator of claim 2, wherein the second slot is defined at the second end of each notch.

7. The stator of claim 1, wherein each support beam is injection-molded into each passageway of the first plurality of passageways and the second plurality of passageways.

8. The stator of claim 1, wherein:

an oblique angle is defined between a central axis of each notch and the second side wall, and each second slot is positioned between the first side wall and each notch.

9. A stator for an electric motor, comprising:

a plurality of stacked laminations, comprising:

a first lamination including (i) a first annular plate and (ii) a plurality of notches defining a plurality of segments in the first annular plate, each segment having a tooth extending therefrom and a slot defined therein, a second lamination positioned on the first lamination, the second lamination including (i) a second annular plate and (ii) a plurality of notches defining a plurality of segments in the second annular plate, each segment having a tooth extending therefrom and a slot defined therein, each slot of the second annular plate being aligned with at least one slot of the first annular plate to define a plurality of passageways through the first and the second laminations, and a plurality of support beams positioned in the plurality of passageways, wherein (i) each passageway is positioned between a pair of planes extending through the first and the second laminations, (ii) a first plane of each pair of planes is defined by a notch of the first lamination and a second plane of each pair of planes is defined by a notch of the second lamination, and (iii) the first plane and the second plane intersect and an acute angle is defined therebetween.

10. The stator of claim 9, wherein the first lamination and the second lamination define a longitudinal axis of the stator, and each tooth extends in a direction toward the longitudinal axis.

11. The stator of claim 9, wherein the first lamination and the second lamination define a longitudinal axis of the stator, and each tooth extends in a direction away from the longitudinal axis.

12. The stator of claim 9, further comprising a polymeric shell coupled to the first lamination and the second lamination, the polymeric shell including a plurality of inner surfaces engaged with a plurality of outer surfaces of the first lamination and the second lamination.

13. The stator of claim 12, wherein the plurality of support beams extend from a first inner surface of the polymeric shell into the passageways.

14. The stator of claim 12, wherein the plurality of support beams include a plurality of pins, each pin comprising a cylindrical shaft positioned in one of the passageways.

15. The stator of claim 14, wherein each pin includes a head secured to the cylindrical shaft, the head engaging an outer surface of one of the first annular plate and the second annular plate.

16. The stator of claim 9, wherein:

each notch of the first lamination is defined between a first inner wall and a second inner wall, the first inner wall includes a substantially planar wall section and a concave wall section that defines a pocket, and the second inner wall includes a substantially planar wall section and a convex wall section positioned in the pocket.

17. A stator for an electric motor, comprising:

a plurality of stacked laminations, each lamination comprising:

an annular plate including (i) a first side wall, (ii) a second side wall positioned opposite the first side wall, and (iii) a plurality of notches defined therein, each notch having a first end positioned between the first side wall and the second side wall and a second end defined in the first side wall, and a plurality of teeth extending from the second side wall of the annular plate, and a polymeric shell coupled to the plurality of laminations, wherein (i) each lamination includes a first slot defined at the first end of each notch and a second slot spaced apart from the first slot, (ii) the first slots of the laminations are aligned to define a first plurality of passageways, (iii) the second slots of the laminations are aligned to define a second plurality of passageways, and (iv) the polymeric shell includes a plurality of support beams that extend through the first plurality of passageways and the second plurality of passageways, wherein an oblique angle is defined between a central axis of each notch and the second side wall, and each second slot is positioned between the first side wall and each notch.

18. The stator of claim 17, wherein each support beam is injection-molded into each passageway of the first plurality of passageways and the second plurality of passageways.

* * * * *